Feb. 22, 1949. W. FERRIS 2,462,734
FLUID TRANSMITTING DEVICE
Filed Feb. 26, 1945 5 Sheets-Sheet 2

INVENTOR.
WALTER FERRIS
BY
ATTORNEY

Feb. 22, 1949.                    W. FERRIS                    2,462,734
                           FLUID TRANSMITTING DEVICE
Filed Feb. 26, 1945                                          5 Sheets-Sheet 3

*INVENTOR.*
WALTER FERRIS
BY
*Wesley P. Merrill*
ATTORNEY

Feb. 22, 1949.     W. FERRIS     2,462,734
FLUID TRANSMITTING DEVICE
Filed Feb. 26, 1945     5 Sheets-Sheet 4

INVENTOR.
WALTER FERRIS
BY
ATTORNEY

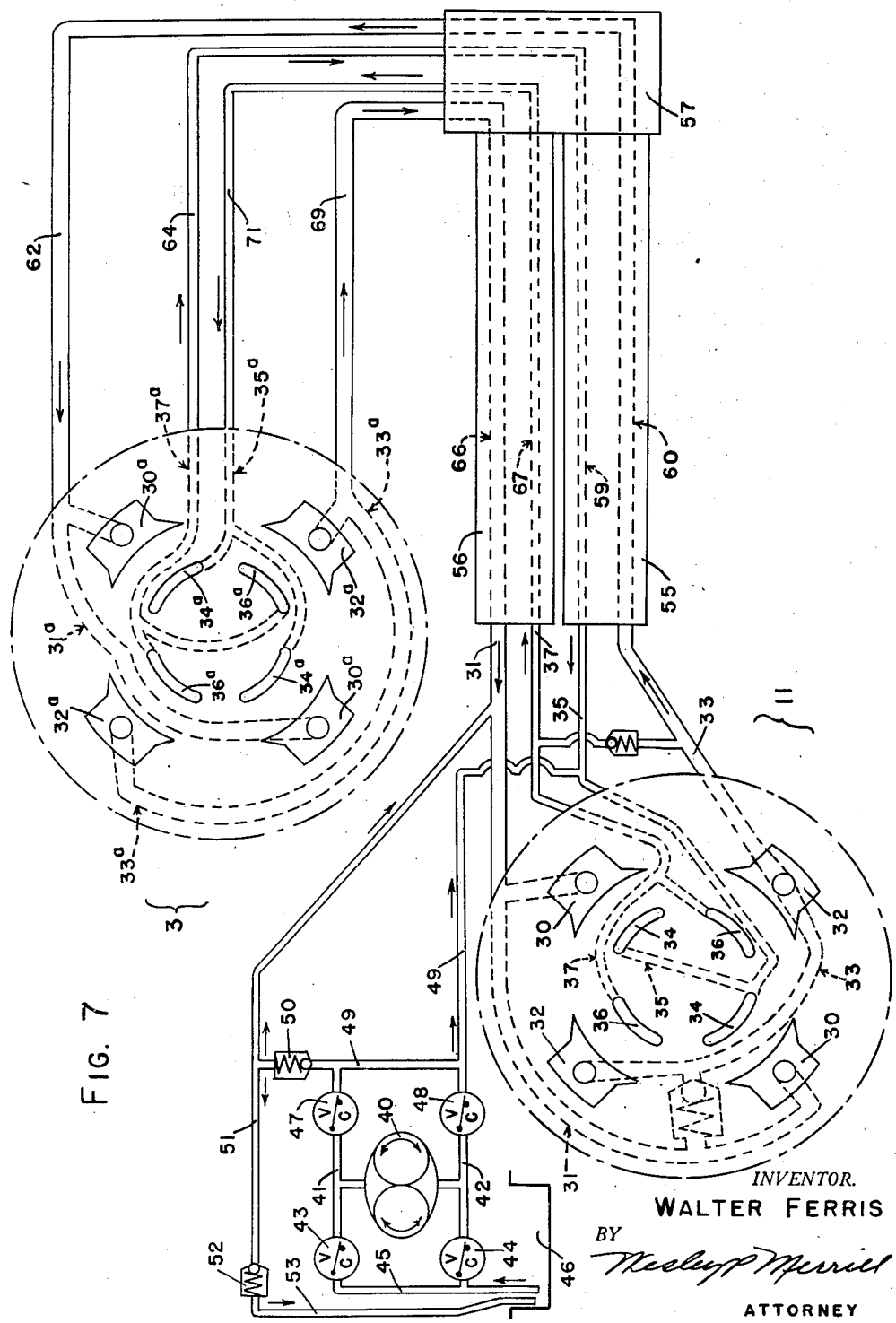

Patented Feb. 22, 1949

2,462,734

UNITED STATES PATENT OFFICE 2,462,734

FLUID TRANSMITTING DEVICE

Walter Ferris, Milwaukee, Wis., assignor to The Oilgear Company, Milwaukee, Wis., a corporation of Wisconsin Application February 26, 1945, Serial No. 579,878

19 Claims. (Cl. 285—22)

This invention relates to devices for transmitting fluid between two relatively movable points.

A device constructed according to the invention is particularly adapted to form a part of the hydraulic circuit of a hydraulic transmission which has one of its power units carried by the body of a vehicle and its other power unit arranged beneath the body and movable with an axle of the vehicle. For the purpose of illustration, the invention has been shown as being part of a hydraulic drive for the lighting and air conditioning apparatus of a railway car but it is not limited to such use.

The invention has an an object to provide a fluid transmitting device which will maintain substantially flulid tight connections between two parts of a fluid circuit while permitting those two parts to move relatively to each other.

Another object is to provide a fluid transmitting device for carrying separate currents of fluid between two points which are relatively movable.

Another object is to provide a device for transmitting fluid in opposite directions simultaneously between two points which are relatively movable.

Other objects and advantages of the invention will appear from the following description of a hydraulic drive having an embodiment of the invention incorporated therein and shown somewhat schematically in the accompanying drawings in which the views are as follows.

Figure 2:
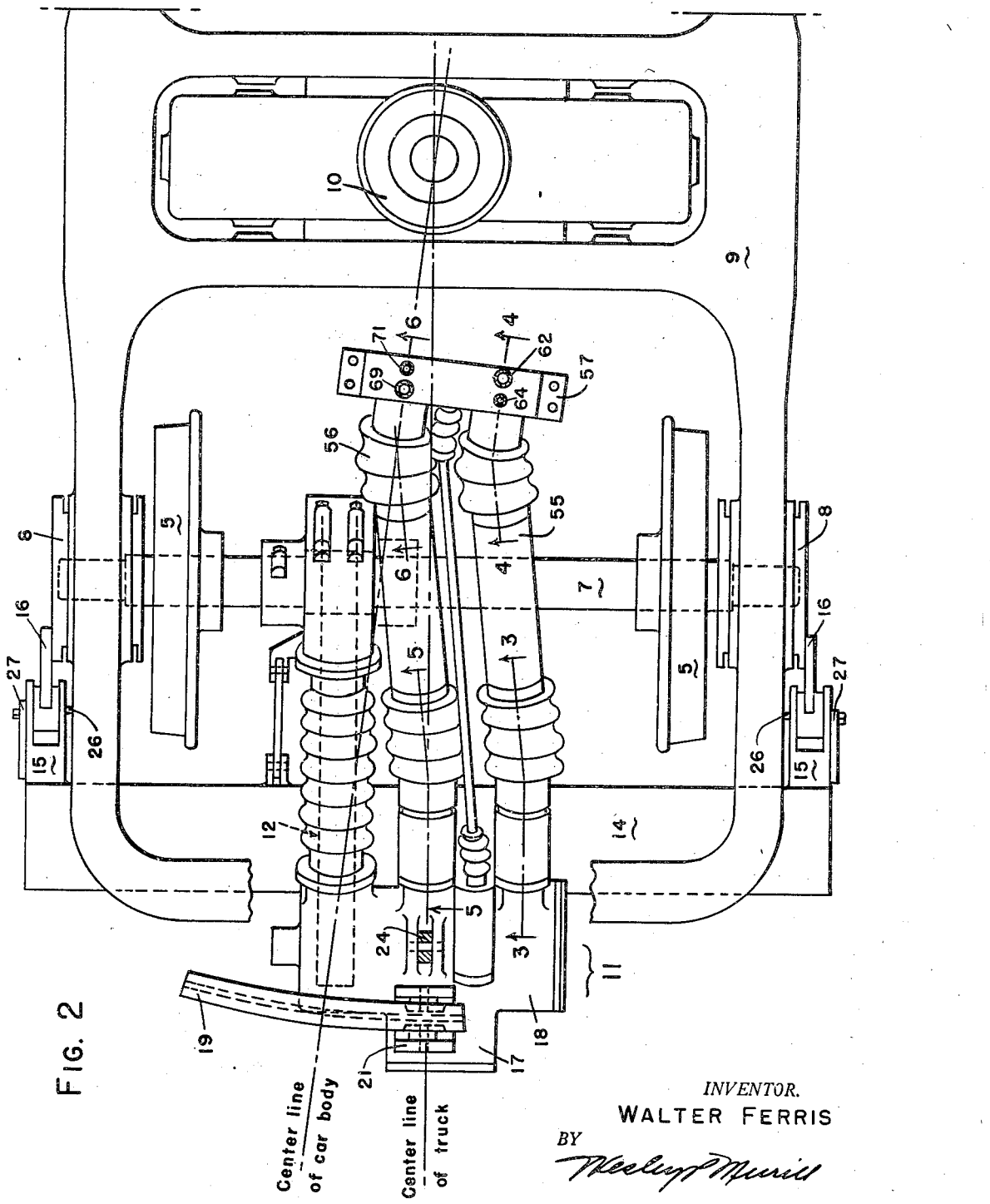
Fig. 2 is a plan view taken on the plane indicated by the arrows 2—2 of Fig. 1, a part of the frame being broken away and the parts being shown in the positions occupied when the car is on a curve of minimum radius.
Figure 3:
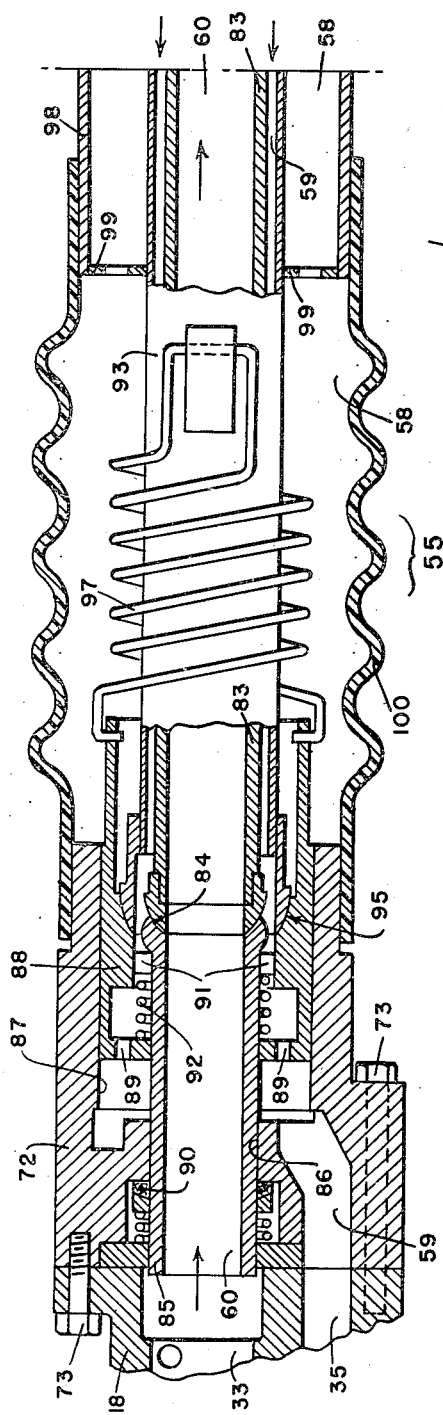
Figure 4:
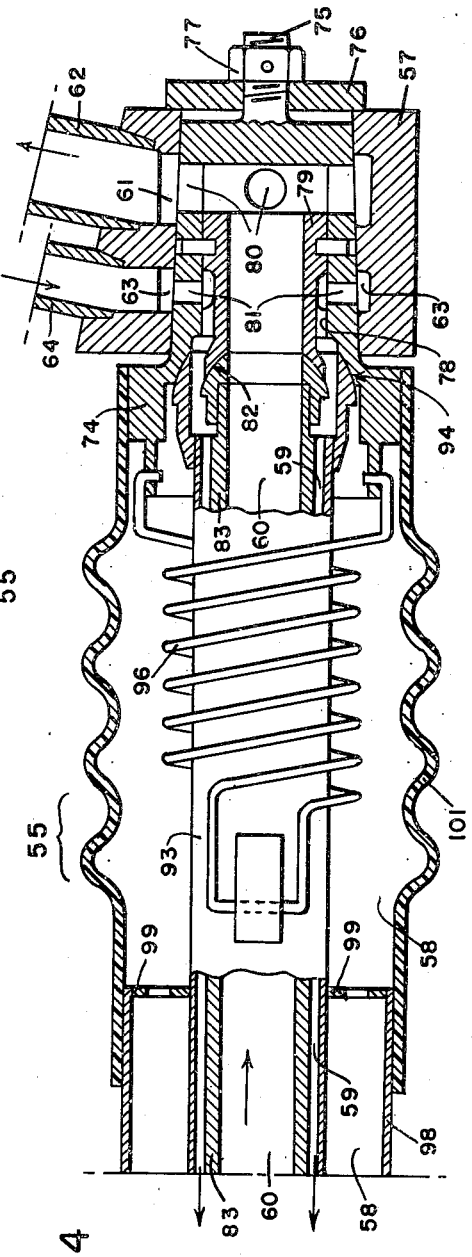

Figs. 3 and 4 are longitudinal sections through the end portions of a fluid transmitting device in which the invention is embodied, the views being indicated by the lines 3—3 and 4—4 of Fig. 2.

Figure 5:
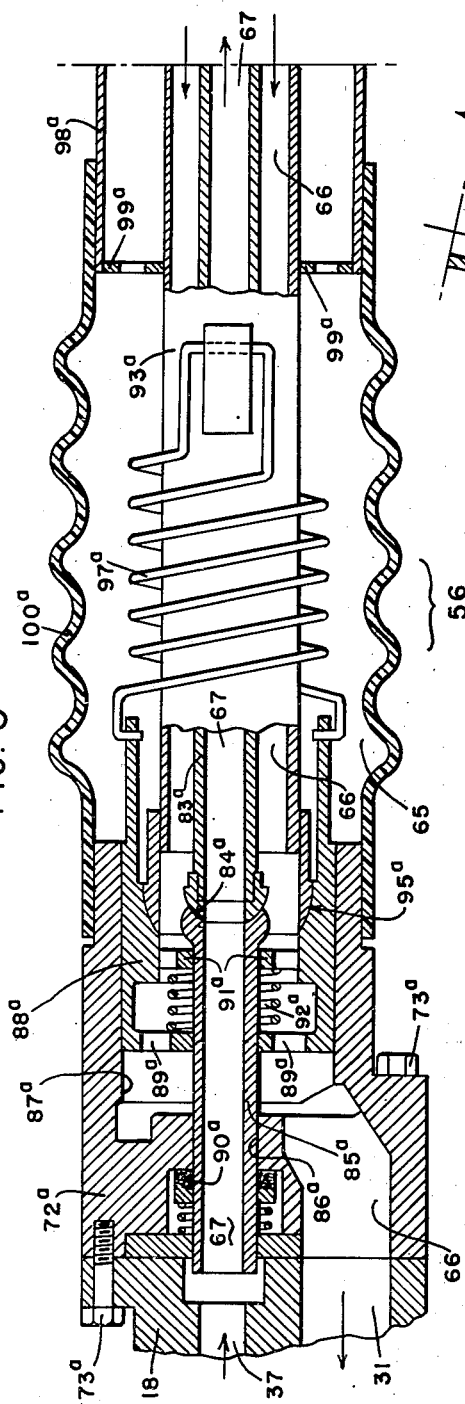
Figure 6:
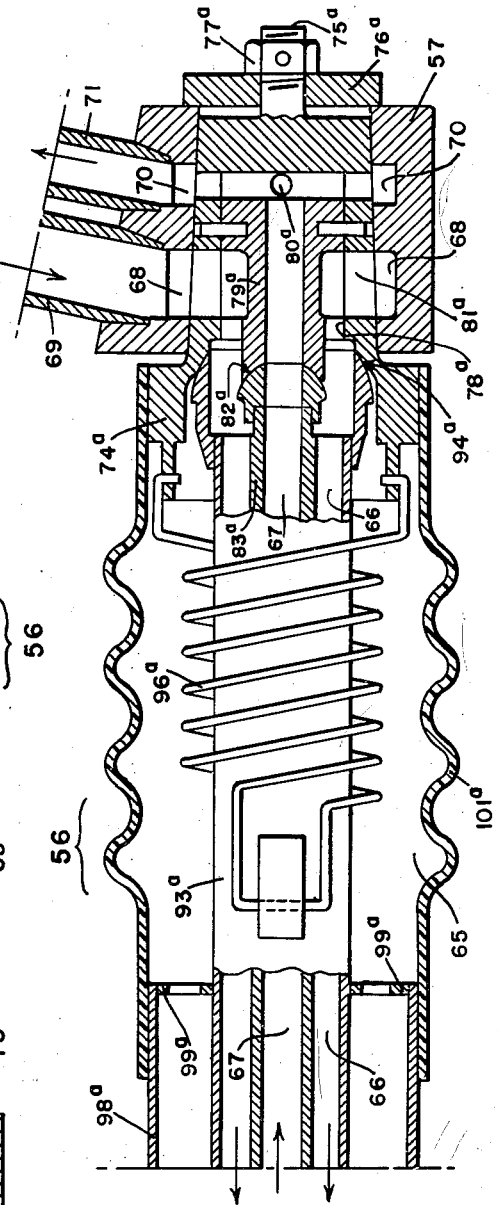

Figs. 5 and 6 are longitudinal sections through the end portions of another fluid transmitting device in which the invention is embodied, the views being indicated by the lines 5—5 and 6—6 of Fig. 2.

Fig. 7 is a diagram of the hydraulic circuits.

Figure 1:
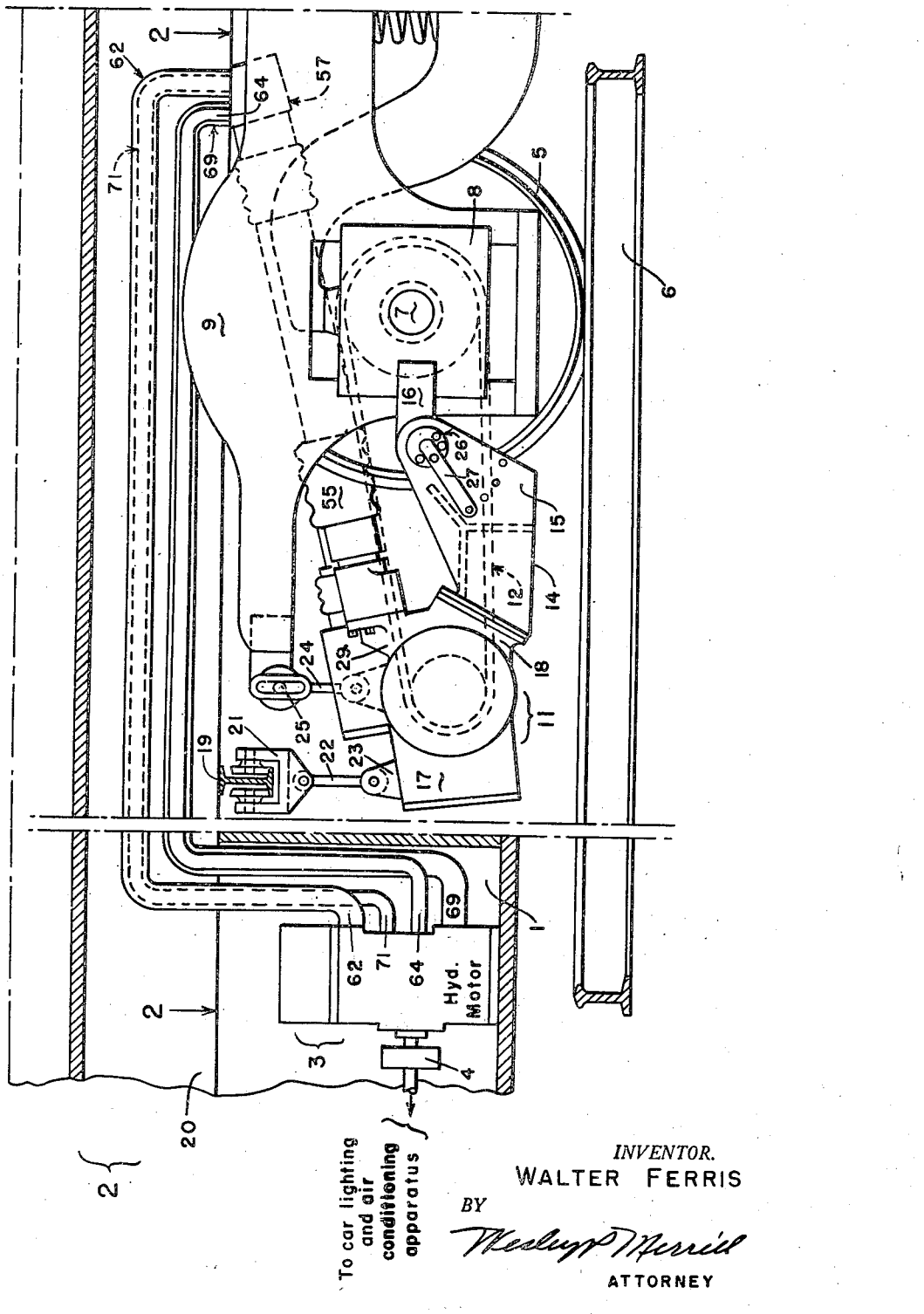
Fig. 1 is a side view partly in section of portions of a railway car in the lighting and air condition apparatus of which is driven by a hydraulic transmission having embodiments of the invention incorporated in its hydraulic circuit.

Since air conditioned railway cars are well known, only so much of the car has been illustrated as is necessary to show the application of the invention thereto. As shown in Fig. 1, the car has a compartment 1 suspended from the car body 2 and enclosing a hydraulic motor 3 which is adapted to drive the car lighting and air conditioning apparatus (not shown) through an overrunning clutch 4.

Car body 2 is pivotally supported in the usual manner upon a pair of trucks each of which has a pair of wheels arranged at each end thereof to support the car upon the track but only a portion of one truck has been shown as the car per se forms no part of the present invention.

In the portion shown, a pair of wheels 5 is supported upon a track 6 and fixed upon an axle 7 having opposite ends thereof mounted in a pair of journal boxes 8 which are slidable vertically in the opposite sides of the frame 9 of the truck and support car body 2 through springs as is well known, car body 2 ordinarily being pivotally connected to each truck at its center as by means of a center bearing 10 (Fig. 2).

Hydraulic motor 3 is adapted to be energized by liquid supplied thereto from a reversible variable displacement pump 11 which is arranged beneath the car body and connected to axle 7 by a suitable drive 12 so that pump 11 is driven in one direction or the other in response to movement of the car in one direction or the other. In order that drive 12 may be properly lubricated and be protected from dust and other foreign matter, it is preferably enclosed within a suitable enclosure.

Pump 11 is fixed to a rigid crossbeam 14 which has a pair of arms 15 fixed to its opposite ends and extending from one side thereof as shown in Figs. 1 and 2. The two arms 15 are connected, respectively, to two lugs 16 which are welded or otherwise rigidly secured, respectively, to the two journal boxes 8 and support crossbeam 14 at one side thereof. The other side of crossbeam 14 may be supported by a hanger which is connected directly thereto but, with the type of pump shown, it is preferably connected to a housing 17 which encloses the control mechanism for pump 11. Housing 17 is fixed to or formed integral with a housing 18 which encloses pump 11 and is fixed to crossbeam 14 so that housings 17 and 18 and crossbeam 14 form a rigid support for pump 11.

As shown in Figs. 1 and 2, the hanger for the pump support may include a curved track such as an I-beam 19 which is fixed by its upper flange to the center sill 20 of the car body, a trolley 21 which is mounted upon the lower flange of track 19 and a link 22 which is pivotally connected to trolley 21 and to suitable lugs 23 fixed to housing 17 upon the center line of the pump support.

When the car passes around a curve, the truck will pivot beneath the car body and trolley 21 will move along track 19 so that hanger 21—22 remains substantially vertical at all times. In order to prevent the pump support from dropping upon track 6 in case hanger 21—22 should fail, a link 24 has its lower end pivoted to housing 18 and its upper end slotted to receive a pin 25 carried by truck frame 9.

Since the car body is supported upon springs, it will move vertically relative to axle 7 and it will sway and lurch due to curves and to unevenness of the track. Swaying and lurching of the car body will not cause any lateral or tilting movement of the pump support for the reason that hanger 21—22 is connected to the pump support upon the center line thereof. Vertical movements of the car body, however, will be transmitted to the pump support through hanger 21—22, and in order that the pump support may pivot relatively to axle 7 and to permit adjustment of drive 12, the two arms 15 are pivotally connected, respectively, to the two lugs 16 by two eccentric pins 26 each of which has attached thereto a lever 27 by means of which it may be rotated to move the pump support toward or from axle 7.

The arrangement is such that the pump support may pivot upon pins 26 in response to vertical movements of car body 2 relative to axle 7 while eccentric pins 26 positively retain the pump support in parallelism with axle 7 and, since hanger 21—22 is connected to the pump support at a single point upon the center line thereof and its upper end is movable transversely of car body 2 so that the pump support cannot be moved laterally or tilted by movement of car body 2, no material distortion of drive 12 will occur.

The enclosure for drive 12 and the arrangement for supporting pump 11 do not per se form any part of the present invention but are fully disclosed and claimed in my co-pending application Serial No. 576,242, filed February 5, 1945, of which this application is a continuation in part and to which reference may be had for details of construction.

Motor 3 is provided with a control which automatically varies motor displacement to maintain the motor speed substantially constant after it has reached its predetermined maximum speed, and pump 11 is provided with a control which causes it to discharge liquid in the same direction regardless of the direction of car movement and which maintains pump displacement at maximum until the car speed has reached the given intermediate speed, such as 25 M. P. H., and thereafter varies pump displacement inversely to variations in car speed above the intermediate speed to thereby enable motor 3 to drive the car lighting and air conditioning apparatus at a substantially constant speed whenever the car is moving at or above the predetermined intermediate speed as fully explained in my co-pending application Serial No. 576,243, filed February 5, 1945.

Motor 3 and pump 11 may be of any suitable type but in the present instance they are preferably of the sliding vane type for the reason that a hydrodynamic machine of that type has a greater volumetric capacity per unit of weight than a piston type machine.

Hydrodynamic machines of the sliding vane type are well known and, since the essential features of motor 3 and pump 11 are explained in application 576,243, they have not been illustrated in detail. It is deemed sufficient to state herein that each includes a rotor having radial vane slots formed therein and vanes slidably fitted in the slots.

The outer ends of the vanes of each machine ride upon an endless vane track which extends around the rotor and includes two diametrically opposed sealing bridges which are arranged close to the periphery of the rotor and two working bridges which are located 90° from the sealing bridges and are spaced from the periphery of the rotor when the machine is performing useful work so that the vanes move outward as they pass from a sealing bridge to a working bridge and are forced inward as they move from a working bridge to a sealing bridge. Two main ports are arranged upon opposite sides of each bridge and a vane slot port is arranged inward from each main port and registers with the inner ends of the vane slots successively as the rotor rotates.

As shown schematically in Fig. 7, pump 11 has two diametrically opposed main ports 30 which communicate with a channel 31, two diametrically opposed main ports 32 which communicate with a channel 33, two diametrically opposed vane slot ports 34 which are spaced inward from ports 30 and communicate with a channel 35, and two diametrically opposed vane slot ports 36 which are spaced inward from ports 32 and communicate with a channel 37. Channels 31, 33, 35 and 37 are formed in a portion of pump housing 18 which thus constitutes a manifold for directing liquid to and from the various ports. Motor 3 has corresponding ports and passages which have been indicated by corresponding reference numerals with the exponent "a" added thereto.

As previously explained, pump 11 is provided with a control which causes it to discharge liquid in but one direction regardless of the direction in which it is driven. That is, liquid is supplied through intake ports 30 and is expelled by the outer end portions of the pump vanes through ports 32, the slots of the outward moving pump vanes are supplied with liquid through ports 34 and the inward moving pump vanes expel liquid from their slots through ports 36.

The liquid expelled by the outer portions of the pump vanes through ports 32 flows through inlet ports 30ᵃ of motor 3 and out of outlet ports 32ᵃ back to intake ports 30 of pump 11. The liquid flowing from ports 30ᵃ to ports 32ᵃ acts upon the outer portions of the motor vanes in contact with the working bridges and causes the rotor of motor 3 to rotate and drive clutch 4. The liquid expelled by the inward moving pump vanes through vane slot ports 36 flows to the vane slot ports 34ᵃ of motor 3 and holds the motor vanes against the vane track. The inward moving motor vanes expel liquid from their slots into ports 36ᵃ and this liquid is returned to vane slot ports 34 of pump 11.

There are thus required two separate circuits, one being a main circuit for the liquid which drives motor 3 and the other being a vane root circuit for the liquid which holds the vanes against the vane tracks. Both the circuits should be kept flooded and liquid for this purpose may be supplied by a gear pump 40 which is driven in unison with pump 11 and arranged in the casing thereof according to the usual practice. Pump 11 is driven in one direction or the other in response to movement of the car in one direction or the other so that gear pump 40 is also driven in opposite directions alternately but it must deliver liquid in only one direction.

As shown schematically in Fig. 7, gear pump 40 has its opposite sides connected to two channels 41 and 42 adjacent ends of which are connected, respectively, through two check valves 43 and 44 to a channel 45 extending into a reservoir 46 which may be arranged within crossbeam 14. Check valves 43—44 permit pump 40 to draw liquid from reservoir 46 into either channel 41 or channel 42 but prevent pump 40 from discharging liquid into reservoir 46. The other ends of channels 41 and 42 are connected, respectively, through two check valves 47 and 48 to a branched channel 49 which has one branch thereof connected to channel 35 and another branch thereof connected through a resistance valve 50 to a channel 51 which has one end connected to channel 31 and its other end connected through a relief valve 52 to a channel 53 which discharges into reservoir 46.

The arrangement is such that, when gear pump 40 is driven in one direction, it will draw liquid from reservoir 46 through channel 45, check valve 43 and channel 41 and discharge it through channel 42 and check valve 48 into channel 49 and, when gear pump 40 is driven in the opposite direction, it will draw liquid from reservoir 46 through channel 45, check valve 44 and channel 42 and discharge it through channel 41 and check valve 47 into channel 49.

A part of the liquid discharged by gear pump 40 into channel 49 will flow to channel 35 to keep the vane root circuit flooded, another part will flow through resistance valve 50 and channel 51 into channel 31 to keep the main circuit flooded and the remainder of the liquid will be exhausted through relief valve 52 and channel 53 into reservoir 46. Gear pump 40 thus maintains in the return side of the main circuit a pressure equal to the resistance of valve 52 and it maintains in the return side of the vane root circuit a pressure equal to the sum of the resistances of valves 50 and 52.

Each side of each circuit must include a flexible portion for the reason that pump 11 moves relatively to motor 3 when the car is in motion. As shown in Figs. 1 and 2, housing 18 of pump 11 is connected by two fluid transmitting devices or slide pipes 55 and 56 to a manifold 57 which is fixed to car body 2 upon the underside thereof. Since slide pipes 55 and 56 cannot be connected to car body 2 at the point at which it is pivoted to the truck for the reason that that point is occupied by center bearing 10, rotation of the truck relative to car body 2 causes a variation in the lengths of slide pipes 55 and 56 but manifold 57 is preferably located as near center bearing 10 as conveniently possible to thereby keep the variations in the lengths of slide pipes 55 and 56 at a minimum.

As shown in Figs. 3 and 4, slide pipe 55 contains an outer annular passage 58 which collects leakage from the vane root circuit and discharges it into reservoir 46 through a passage not shown, an annular passage 59 which is arranged within passage 58 and forms a part of the return side of the vane root circuit, and a central passage 60 which is arranged within passage 59 and forms a part of the pressure side of the main circuit.

Passage 60 communicates at its left end with discharge passage 33 of pump 11 and it communicates at its right end with a port 61 which is formed in manifold 57 and connected by a channel 62 to motor 3 in communication with the inlet passage 31ª thereof. Passage 59 communicates at its left end with passage 35 of pump 11 and it communicates at its right end with a port 63 which is formed in manifold 57 and connected by a channel 64 to motor 3 in communication with passage 37ª thereof.

As shown in Figs. 5 and 6, slide pipe 56 contains an outer annular passage 65 which collects leakage from the return side of the main circuit and discharges it into reservoir 46 through a passage not shown, an annular passage 66 which is arranged within passage 65 and forms a part of the return side of the main circuit, and a central passage 67 which is arranged within passage 66 and forms a part of the pressure side of the vane root circuit.

Passage 66 communicates at its left end with inlet passage 31 of pump 11 and it communicates at its right end with a port 68 which is formed in manifold 57 and connected by a channel 69 to motor 3 in communication with the outlet passage 33ª thereof. Passage 67 communicates at its left end with passage 37 of pump 11 and it communicates at its right end with a port 70 which is formed in manifold 57 and connected by a channel 71 to motor 3 in communication with passage 35ª thereof.

The arrangement is such that any liquid leaking from the high pressure side of either circuit enters the low pressure side of the other circuit and any liquid leaking from the low pressure side of either circuit enters the outer annular passage 58 or 65 and then flows to reservoir 46.

In order that fluid transmitting device or slide pipe 55 may be connected between pump housing 18 and manifold 57, it includes a left end section 72 (Fig. 3) which is rigidly secured to pump housing 18 as by means of bolts 73, and a right end section 74 (Fig. 4) which has a portion thereof tapered and tightly fitted in a complementary bore formed in manifold 57. Section 74 has a stud 75 fixed to the end thereof and extending through a plate 76 arranged upon the end of manifold 57. A nut 77 threaded upon stud 75 may be tightened against plate 76 to wedge end section 74 into manifold 57 and thereby provide a liquid tight joint therebetween.

End section 74 has an axial bore 78 formed therein and a tubular element 79 is arranged within bore 78 with its right end portion tightly fitted therein to provide a liquid tight joint. Element 79 may be fixed in position by one or more suitable pins fitted in its wall and in the wall of section 74. The bore of element 79 forms a part of passage 60 and communicates with port 61 in manifold 57 through a plurality of radial passages 80 which are formed in section 74.

The left portion of element 79 is smaller in diameter than bore 78 and the space between the periphery of that portion of element 79 and the wall of bore 78 forms a part of passage 59 and communicates with port 63 in manifold 57 through a plurality of radial passages 81 which are formed in section 74.

The left end of element 79 is provided with one part of an annular ball and socket joint 82 the other part of which is arranged upon the right end of a pipe 83 which constitutes the intermediate portion of passage 60. The left end of pipe 83 is provided with one part of an annular ball and socket joint 84 (Fig. 3) the other part of which is arranged upon the adjacent end of a tubular piston 85 which constitutes the left portion of passage 60 and extends through end section 72 into communication with passage 33 of pump 11. Passage 60 is thus formed by piston 85, pipe 83, element 79 and passages 80 so that liquid may flow freely from passage 33 of pump 11 to port 61 in manifold 57.

End section 72 contains an axial bore 86, a counterbore 87 which is concentric with bore 86 and has a hollow piston 88 closely fitted therein, and a portion of passage 59 which is arranged at one side of bore 86 and communicates with counterbore 87 and with passage 35 in pump housing 18.

Piston 85 is closely fitted in bore 86 to slide therein and it extends loosely through the head of piston 88 which also has a plurality of passages 89 formed therein to provide communication between counterbore 87 and the interior of piston 88. The left end of bore 86 is enlarged and an oil seal 90 is arranged therein to prevent leakage of liquid from passage 33 into counterbore 87.

A plurality of lugs 91 are arranged upon piston 85 in an annular row adjacent joint 84 and are spaced apart to permit free flow of liquid through passage 59. A spring 92 is arranged around piston 85 between lugs 91 and the head of piston 88 to urge piston 85 against pipe 83 and pipe 83 against element 79 to thereby initially keep joints 82 and 84 tight. When pump 11 is delivering liquid under pressure to motor 2, pump pressure extends into the film between the two parts of each joint and tends to separate them but the same pressure acts upon the left end of piston 85 so that the total force which keeps the joint parts together is always greater than and varies in accordance with the variations in the force which tends to separate them.

Pipe 83 is arranged inside of a pipe 93 which is large enough to provide between its inner periphery and the outer periphery of pipe 83 a space which forms the portion of passage 59 between end section 74 and piston 88.

End section 74 (Fig. 4) has formed upon its inner wall an annular spherical surface which forms one part of a ball and socket joint 94 the other part of which is arranged upon the right end of pipe 93. Piston 88 (Fig. 3) likewise has formed upon its inner wall an annular spherical surface which forms one part of a ball and socket joint 95 the other part of which is arranged upon the left end of pipe 93. Passage 59 thus includes the portion thereof that is formed in end section 72 and communicates with passage 35, counterbore 87, passages 89, the interior of piston 88, the space between pipes 83 and 93, the space between the outside of element 79 and the wall of bore 78 in end section 74, and passages 81 which communicate with port 63 in manifold 57. Therefore, liquid may flow freely from port 63 to passage 35.

Ball and socket joint 94 is initially kept tight by a coil spring 96 which urges pipe 93 toward the right and has one of its ends connected to pipe 93 and its other end connected to the skirt of end section 74.

Ball and socket joint 95 is initially kept tight by a coil spring 97 which urges piston 88 toward the right and has one of its ends connected to pipe 93 and its other end connected to the skirt of piston 88. Coil springs 96 and 97 must have sufficient tension to overcome the opposing force exerted by spring 92 and to also urge piston 88 toward the right with sufficient force to initially keep ball and socket joints 94 and 95 tight. When the car is in motion so that gear pump 40 is operating, the pressure created in passage 35 by pump 40 extends into the film between the two parts of each of ball and socket joints 94 and 95 and tends to separate them but the same pressure acts upon the left end of piston 88 so that the total force which keeps the joint parts together in always greater than the force which tends to separate them.

Pipe 93 has its central portion arranged within a considerably larger pipe 98 which is spaced from pipe 93 by apertured separators 99 to provide a space which forms a part of passage 58. The left end portion of pipe 93 is enclosed within a flexible shield 100 which has its ends sealed to pipe 98 and to end sections 72, respectively, and provides a second portion of passage 58. The right end portion of pipe 93 is enclosed within a flexible shield 101 which has its ends sealed to pipe 98 and to end section 74, respectively, and provides a third portion of passage 58.

The arrangement is such that any liquid leaking from high pressure passage 60 through joints 82 and 84 or past seal 90 enters low pressure passage 59 and any liquid leaking from low pressure passage 59 through joints 94 and 95 or past piston 88 is collected in passage 58 and drained therefrom into reservoir 46 through a passage arranged in a plane not shown in the drawings.

If pump 11 and motor 2 were of a type that required only a single circuit, only one fluid transmitting device would be needed and it would only be necessary to make low pressure passage 59 large enough to carry the return flow from the motor. In the present instance however, two separate circuits are required and the two fluid transmitting devices 55 and 56 have been provided.

Fluid transmitting device or slide pipe 56 is substantially the same as slide pipe 55 except that passage 67 is smaller than passage 60 and passage 66 is larger than passage 59. Therefore, a detailed description of slide pipe 56 is deemed unnecessary since corresponding parts have been indicated by corresponding reference numerals with the exponent "a" added to the reference numerals applied to slide pipe 56.

High pressure passage 67 in slide pipe 56 is formed by piston 85a, pipe 83a, element 79a, passages 80a and port 70 through which liquid may flow freely from passage 37 of pump 11 to channel 71. Low pressure passage 66 includes port 68 in manifold 57, passages 81a, the space between the outside of element 79a and the wall of bore 78a, the space between pipes 83a and 93a, the interior of piston 88a, passages 89a, counterbore 87a, and a portion of passage 66 which is formed in the end section 72a. Liquid may thus flow freely from channel 69 to passage 31 of pump 11.

Piston 85a, pipe 83a and element 79a are made smaller in diameter than piston 85, pipe 83 and element 79, respectively, for the reason that they form parts of the high pressure side of the vane root circuit, which carries considerably less liquid than the main circuit, but pipe 93a may be the same size as pipe 93 since decreasing the diameter of pipe 83a correspondingly increases the space between its outer periphery and the inner periphery of pipe 93a.

Any liquid leaking from high pressure channel 67 enters channel 66 which forms a part of the low pressure side of the main circuit, and any liquid leaking from channel 66 is collected in channel 65 and drained therefrom into reservoir 46 through a passage arranged in a plane not shown in the drawings.

Ball and socket joints 82, 82ª, 94 and 94ª and flexible shields 101 and 101ª permit slide pipes 55 and 56 to bend in any direction at a point near manifold 57. Ball and socket joints 84, 84ª, 95 and 95ª and flexible shields 100 and 100ª permit slide pipes 55 and 56 to bend in any direction at a point near pump housing 18. Pistons 85, 85ª, 88 and 88ª and flexible shields 100 and 100ª permit slide pipes 55 and 56 to vary in length. Therefore, pump 11 may move vertically relative to axle 7 and in any direction relative to car body 2 while slide pipes 55 and 56 maintain substantially fluid tight channels between pump housing 18 and manifold 57.

The fluid transmitting devices described herein may be modified in various ways and adapted to various uses without departing from the scope of the invention which is hereby claimed as follows:

1. A fluid transmission device comprising two end sections each of which contains a plurality of concentric passages, a plurality of concentric conduits arranged between said end sections with each conduit in communication with a passage in each end section, and a plurality of means for providing substantially fluid tight joints between each of said end sections and the adjacent ends of said conduits, each of said means including a hollow ball and socket joint, to provide a seal between an end of a conduit and the passage with which that conduit communicates.

2. A fluid transmission device comprising two end sections each of which contains a plurality of concentric passages, a plurality of concentric conduits arranged between said end sections with each conduit in communication with a passage in each end section, a plurality of means for providing substantially fluid tight joints between said conduits and said end sections and including hollow ball and socket joints each of which provides a seal between an end of a conduit and the passage with which that conduit communicates, yieldable means for initially keeping said ball and socket joints tight, and fluid pressure means for assisting said yieldable means.

3. A fluid transmitting device for transmitting fluid between passages in two relatively movable members, comprising an end section connected to each of said members and having a bore formed therein and communicating with a passage in the member, a conduit arranged between said end sections and communicating with the bores therein, means providing a substantially fluid tight joint between one end of said conduit and one of said end sections, and means forming an extensible and flexible joint between the other end of said conduit and the other section to permit the member connected to said other end section to move axially of or at an angle to said conduit.

4. A fluid transmitting device for transmitting fluid between passages in two relatively movable members, comprising an end section connected to one of said members and having a bore formed therein and communicating with a passage in that member, a conduit having one end connected to the other member in communication with a passage therein, a hollow piston fitted in the bore of said end section, and a hollow ball and socket joint connecting the other end of said conduit to said piston in communication with the interior thereof and forming with said piston an extensible and flexible joint which permits the member connected to said end section to move axially of or at an angle to said conduit.

5. A fluid transmitting device for transmitting fluid between passages in two relatively movable members, comprising an end section connected to one of said members and having a bore formed therein and communicating with a passage in that member, a conduit having one end connected to the other member in communication with a passage therein, a hollow piston fitted in the bore of said end section, a hollow ball and socket joint connecting the other end of said conduit to said piston in communication with the interior thereof and forming with said piston an extensible and flexible joint which permits the member connected to said end section to move axially of or at an angle to said conduit, and spring means for urging said piston and said conduit toward each other to keep said ball and socket joint tight.

6. A fluid transmitting device for transmitting fluid between passages in two relatively movable members, comprising an end section connected to each of said members and having a bore formed therein and communicating with a passage in the member, a conduit arranged between said end sections and communicating with the bores therein, a hollow ball and socket joint connecting one end of said conduit to one of said end sections, a hollow piston fitted in the bore of the other end section, and a hollow ball and socket joint connecting the other end of said conduit to said piston in communication with the interior thereof.

7. A fluid transmitting device for transmitting fluid between passages in two relatively movable members, comprising an end section connected to each of said members and having a bore formed therein and communicating with a passage in the member, a conduit arranged between said end sections and communicating with the bores therein, means providing a substantially fluid tight joint between one end of said conduit and one of said end sections, means forming an extensible and flexible joint between the other end of said conduit and the other section, a large conduit enclosing the first mentioned conduit and providing a fluid passage between the walls of said conduits, and means for connecting the ends of said large conduit to said end sections and including an extensible and flexible joint, said extensible and flexible joints permitting said other section to move axially of or at an angle to said conduits and being adapted to remain substantially fluid tight during such movements.

8. A fluid transmitting device for transmitting fluid between passages in two relatively movable members, comprising an end section connected to each of said said members and having a bore formed therein and communicating with a passage in the member, a conduit arranged between said end sections and communicating with the bores therein, a hollow ball and socket joint connecting one end of said conduit to one of said end sections, a hollow piston fitted in the bore of the other end section, a hollow ball and socket joint connecting the other end of said conduit to said piston in communication with the interior thereof and forming with said piston an extensible and flexible joint which permits the member connected to said end section to move axially of or at an angle to said conduit, a large conduit enclosing the first mentioned conduit and providing a fluid passage between the walls of said conduits, and a flexible joint connecting one end of said large conduit to said one end section and an extensible and flexible joint connecting the other end of said large conduit to said other end section to permit said members to move relatively to each other.

9. A fluid transmitting device for transmitting fluid between passages in two relatively movable members, comprising an end section connected to each of said tmembers and provided with bores for communication with said passages, an inner conduit arranged between said end sections and communicating with a bore in each, means providing a substantially fluid tight joint between one end of said conduit and one of said end sections, means forming an extensible and flexible joint between the other end of said conduit and the other end section, a large conduit enclosing said inner conduit and providing between the walls of the two conduits a passage which communicates with another bore in each of said end sections, means for providing a substantially fluid tight joint between one end of said large conduit and said one end section, and means forming an extensible and flexible joint between the other end of said large conduit and said other end section, said extensible and flexible joints permitting the member connected to said other end section to move axially of or at an angle to said conduits.

10. A fluid transmitting device for transmitting fluid between passages in two relatively movable members, comprising an end section connected to each of said members and provided with bores for communication with said passages, an inner conduit arranged between said end sections and communicating with a bore in each, means providing a flexible and substantially fluid tight joint between one end of said conduit and one of said end sections, means forming an extensible and flexible joint between the other end of said conduit and the other end section, a large conduit enclosing said inner conduit and providing between the walls of the two conduits a passage which communicates with another bore in each of said end sections, means for providing a flexible and substantially fluid tight joint between one end of said large conduit and said one end section, and means forming an extensible and flexible joint between the other end of said large conduit and said other end section, said joints permitting said members to move relatively to each other.

11. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and having inner and outer passages formed therein for communication with passages in that member, an inner conduit arranged between said end sections to provide a passage from said inner passage to the interior of said inner piston, a large conduit enclosing said inner conduit and providing between the walls of said conduits a passage from said outer passage to the interior of said outer piston, means providing a substantially fluid tight joint between one end of each of said conduits and said second end section, a hollow ball and socket joint between the other end of said inner conduit and said inner piston, and a hollow ball and socket joint between the other end of said large conduit and said outer piston.

12. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and having inner and outer passages formed therein for communication with passages in that member, an inner conduit arranged between said end sections to provide a passage from said inner passage to the interior of said inner piston, a large conduit enclosing said inner conduit and providing between the walls of said conduits a passage from said outer passage to the interior of said outer piston, means providing a substantially fluid tight joint between one end of each of said conduits and said second end section, a hollow ball and socket joint between the other end of said inner conduit and said inner piston, a hollow ball and socket joint between the other end of said large conduit and said outer piston, and spring means for keeping said ball and socket joints tight.

13. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and having inner and outer passages formed therein for communication with passages in that member, an inner conduit arranged between said end sections to provide a passage from said inner passage to the interior of said inner piston, a large conduit enclosing said inner conduit and providing between the walls of said conduits a passage from said outer passage to the interior of said outer piston, a hollow ball and socket joint providing a seal between one end of said inner conduit and the inner passage in said second end section, a hollow ball and socket joint providing a seal between the adjacent end of said large conduit and the outer passage in said second end section, a hollow ball and socket joint between the other end of said inner conduit and said inner piston, and a hollow ball and socket joint between the other end of said larger conduit and said outer piston.

14. A fluid transmitting device for transmitting fluid between passages in two relatively movable members, comprising an end section connected to each of said members and provided with bores for communication with said passages, an inner conduit arranged between said end sections and communicating with a bore in each, means providing a substantially fluid tight joint between one end of said conduit and one of said end sections, means forming an extensible and flexible joint between the other end of said conduit and the other end section, a large conduit enclosing said inner conduit and providing between the walls of the two conduits a passage which communicates with another bore in each of said end sections, means for providing a substantially fluid tight joint between one end of said large conduit and said one end section, means forming an extensible and flexible joint between the other end of said large conduit and said other end section, said extensible and flexible joints permitting the member connected to said other end section to move axially of or at an angle to said conduits, and a flexible shield enclosing said large conduit and sealed to said end sections to provide between the walls of said large conduit and said flexible shield a passage for leakage liquid.

15. A fluid transmitting device for transmitting fluid between passages in two relatively movable members, comprising an end section connected to each of said members and provided with bores for communication with said passages, an inner conduit arranged between said end sections and communicating with a bore in each, means providing a flexible and substantially fluid tight joint between one end of said conduit and one of said end sections, means forming an extensible and flexible joint between the other end of said conduit and the other end section, a large conduit enclosing said inner conduit and providing between the walls of the two conduits a passage which communicates with another bore in each of said end sections, means for providing a flexible and substantially fluid tight joint between one end of said large conduit and said one end section, means forming an extensible and flexible joint between the other end of said large conduit and said other end section, said joints permitting said members to move relatively to each other, and a larger conduit enclosing said large conduit and connected to said end sections to provide between the walls of said large and larger conduits a passage for leakage liquid, said larger conduit having flexible and extensible portions which yield during movement of a member.

16. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and having inner and outer passages formed therein for communication with passages in that member, an inner conduit arranged between said end sections to provide a passage from said inner passage to the interior of said inner piston, a large conduit enclosing said inner conduit and providing between the walls of said conduits a passage from said outer passage to the interior of said outer piston, means providing a substantially fluid tight joint between one end of each of said conduits and said second end section, a hollow ball and socket joint between the other end of said inner conduit and said inner piston, a hollow ball and socket joint between the other end of said large conduit and said outer piston, and a larger conduit enclosing said large conduit and connected to said end sections to provide between the walls of said large and larger conduits a passage for leakage liquid, said larger conduit having a flexible and extensible portion which yields during movement of a member.

17. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and having inner and outer passages formed therein for communication with passages in that member, an inner conduit arranged between said end sections to provide a passage from said inner passage to the interior of said inner piston, a large conduit enclosing said inner conduit and providing between the walls of said conduits a passage from said outer passage to the interior of said outer piston, a hollow ball and socket joint providing a seal between one end of said inner conduit and the inner passage in said second end section, a hollow ball and socket joint providing a seal between the adjacent end of said large conduit and the outer passage in said second end section, a hollow ball and socket joint between the other end of said inner conduit and said inner piston, a hollow ball and socket joint between the other end of said large conduit and said outer piston, and a flexible shield enclosing said large conduit and sealed to said end sections to provide between the walls of said large conduit and said shield a passage for leakage liquid.

18. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and provided with a bore and two passages leading therefrom for communication with passages in said other member, a hollow element fixed in said bore and forming therewith inner and outer passages which communicate with the passages in said second end section, an inner conduit arranged between said end sections to provide a passage from said inner passage to the interior of said inner piston, a large conduit enclosing said inner conduit and providing between the walls of said conduits a passage from said outer passage to the interior of said outer piston, a hollow ball and socket joint providing a seal between one end of said inner conduit and said element, a hollow ball and socket joint providing a seal between the adjacent end of said large conduit and said second end section, a hollow ball and socket joint between the other end of said inner conduit and said inner piston, a hollow ball and socket joint between the other end of said large conduit and said outer piston, and spring means for keeping said ball and socket joints tight.

19. A fluid transmitting device for transmitting fluid between passages in two relatively movable members, comprising a first end section adapted to be connected to one of said members and having a bore and a counterbore formed therein for communication with passages in that member, an inner hollow piston fitted in said bore, an outer hollow piston fitted in said counterbore, a second end section adapted to be connected to the other member and provided with a bore and two passages leading therefrom for communication with passages in said other member, a hollow element fixed in said bore and forming therewith inner and outer passages which communicate with the passages in said second end section, an inner conduit arranged between said end section to provide a passage from said inner passage to the interior of said inner piston, a large conduit enclosing said inner conduit and providing between the walls of said conduits a passage from said outer passage to the interior of said outer piston, a hollow ball and socket joint providing a seal between one end of said inner conduit and said element, a hollow ball and socket joint providing a seal between the adjacent end of said large conduit and said second end section, a hollow ball and socket joint between the other end of said inner conduit and said inner piston, a hollow ball and socket joint between the other end of said large conduit and said outer piston, spring means for keeping said ball and socket joints tight, and a flexible shield enclosing said large conduit and sealed to said end sections to provide between the walls of said large conduit and said shield a passage for leakage liquid.

WALTER FERRIS.

REFERENCES CITED

The following references are of record in the file of this patent:

UNITED STATES PATENTS

| Number | Name | Date |
|---|---|---|
| 130,216 | Goodald | Aug. 6, 1872 |
| 289,265 | Hurly | Nov. 27, 1883 |
| 1,180,806 | Vedder | Apr. 25, 1916 |
| 1,821,274 | Plummer | Sept. 1, 1931 |
| 2,295,907 | Lewis | Sept. 15, 1942 |

FOREIGN PATENTS

| Number | Country | Date |
|---|---|---|
| 27,491 | Great Britain | Nov. 25, 1910 |